United States Patent [19]

Parsch et al.

[11] 4,238,715

[45] Dec. 9, 1980

[54] STARTING CIRCUIT FOR A TRACKBOUND ELECTRIC PROPULSION VEHICLE HAVING A SYNCHRONOUS LINEAR MOTOR

[75] Inventors: Claus P. Parsch, Forchheim; John P. Gibson, Fürth-Vach, both of Fed. Rep. of Germany

[73] Assignee: Siemens Aktiengesellschaft, Munich, Fed. Rep. of Germany

[21] Appl. No.: 20,407

[22] Filed: Mar. 14, 1979

[30] Foreign Application Priority Data

Mar. 28, 1978 [DE] Fed. Rep. of Germany ....... 2813253

[51] Int. Cl.³ .............................................. H02K 41/02
[52] U.S. Cl. ........................................ 318/135; 104/292
[58] Field of Search ................. 318/135; 310/12–14; 104/148 R, 148 LM

[56] References Cited

U.S. PATENT DOCUMENTS

| | | | |
|---|---|---|---|
| 3,904,941 | 9/1975 | Matsui et al. | 104/148 LM X |
| 3,904,942 | 9/1975 | Holtz | 318/135 |
| 3,914,669 | 10/1975 | Holtz | 318/135 |
| 3,914,670 | 10/1975 | Holtz | 318/135 |
| 3,960,090 | 6/1976 | Maki et al. | 104/148 LM |
| 4,013,014 | 3/1977 | Holtz | 310/13 X |
| 4,068,152 | 1/1978 | Nakamura et al. | 310/12 X |

*Primary Examiner*—Donovan F. Duggan
*Attorney, Agent, or Firm*—Kenyon & Kenyon

[57] ABSTRACT

A circuit arrangement for starting a trackbound electric propulsion vehicle having a synchronous linear motor without iron in which the motor's stator is a traveling-field winding installed along the track. The exciter of the motor is a translator arranged on the propulsion vehicle, preferably as a superconducting magnet coil. The traveling-field winding is powered, section by section, from stationary, controlled, static converters at voltages and frequencies which can be varied by a control device. The relative position of the exciter with respect to the traveling-field winding and the travel velocity are determined by a computing circuit from the phase currents and voltages at the feed point. In starting, the control circuits of the control device are opened and a starting circuit is added instead. The starting circuit determines the required thrust, the travel velocity, and the exciter position relative to the traveling-field winding from a velocity reference value controlled by a start-up generator. A signal for damping the control component determining the thrust is derived from a measured value of thrust. In this manner, the starting of the propulsion vehicle is made possible without the motor falling out of step or the occurrence of undesirable hunting.

3 Claims, 15 Drawing Figures

STARTING CIRCUIT FOR A TRACKBOUND ELECTRIC PROPULSION VEHICLE HAVING A SYNCHRONOUS LINEAR MOTOR

BACKGROUND OF THE INVENTION

1. Field of the Invention

This invention relates to a circuit arrangement for starting a trackbound electric propulsion vehicle having a synchronous linear motor without iron. More particularly, the motor has a stator, designed as a traveling-field winding, installed along the line, and an exciter, designed as a translator, arranged on the propulsion vehicle. The traveling-field winding is supplied with voltage and frequency from a stationary, controlled static converter in response to an associated control device having a computing circuit for determining the travel velocity and the relative position of the exciter with respect to the traveling-field winding from the phase currents and voltages at the feed point.

2. Description of the Prior Art

A circuit arrangement of the general type just described is discussed in German Pat. No. 23 41 761. In it, the current in the traveling-field winding determines the magnitude of the propulsion force developed in a propulsion vehicle having a synchronous linear motor. The frequency of the current determines the velocity. An appropriately designed control sees to it that the synchronous linear motor is operated, as far as possible, at the optimum operating point. The control device generates control voltages for the control unit of the converter as setting signals. For such a control, knowledge of the operating condition of the linear motor and, in particular, its pole position is required. Pole position, or vehicle position angle, is the relative position of the exciter with respect to the traveling field winding. The vehicle position angle can be determined from electrical measurements made at the point at which the converter feeds into the traveling field winding. This known, indirect method of measurement is based on the consideration that all information important for the control can be determined from the main field voltage induced in the traveling-field winding by motion of the exciter in translation. In particular, the speed of the vehicle can be determined from the frequency of the main field voltage and the pole position, from its phase angle. This measuring method does not work when a propulsion vehicle is standing still, since no main field voltage is induced in the traveling-field winding by the then stationary exciter.

It is an object of the present invention to provide a circuit arrangement which makes it possible to start up a vehicle propelled by a synchronous linear motor without iron in which the motor does not fall out of step and in which undesirable hunting does not occur.

BRIEF DESCRIPTION OF THE INVENTION

According to the invention, when starting, the control circuits of a control device are opened and a starting circuit is added which determines the required thrust, the travel speed, and the relative position of the exciter with respect to the traveling-field winding from a speed reference value derived from a start-up generator in which a signal for damping the control component determining the thrust is derived from a measured value for the thrust and is applied to the corresponding control circuit.

The control described in the above-mentioned German Patent is designed to operate in polar coordinates in which the magnitude and the phase of the current vector are influenced separately. In accordance with the present invention, when control in polar coordinate is employed, the magnitude of the current is held constant during starting and the current angle or the angular velocity of the current angle is present in a controlled manner.

When the control is designed to operate in Cartesian coordinates, the current components are influenced separately on the Park axes. In that case, according to the present invention, the current component which determines the lift force of the linear motor is held constant and the current component which determines the thrust is preset in a controlled manner.

In both cases, provision is made for the prevention of hunting during start-up by means of a signal for damping the thrust control regulating component which is derived from measurement of the thrust. The measured value for the thrust, weighted by a reduction factor, is added to the component controlling the thrust in a compensating sense. In the alternative, a thrust control is provided which is driven by the difference between the measured value of the thrust and the determined control component, the output signal being used to determine the exciter position relative to the traveling-field winding, and to determine travel velocity.

The direct measurement of the thrust is accomplished, in one embodiment, by means of load cells on the mountings by which the exciter is fastened to the propulsion vehicle.

DETAILED DESCRIPTION OF THE INVENTION

Figure 1:
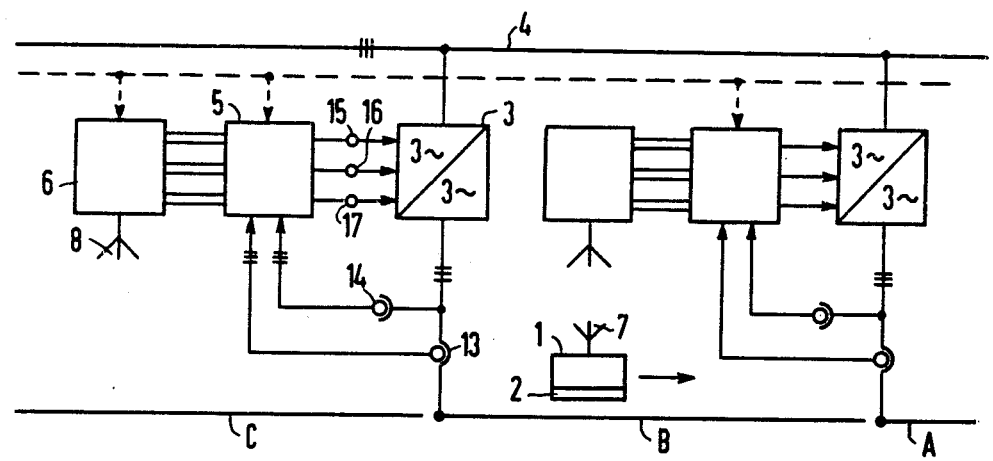
FIG. 1 is a diagrammatic representation of a propulsion vehicle on a track and having the associated control devices.

FIG. 1 shows, diagrammatically, a trackbound propulsion vehicle 1 which is adapted for motion along a track (not shown) in the direction of the arrow. Vehicle 1 contains an exciter or translator 2 which may extend the entire length of the vehicle. In the illustrative embodiment, the exciter 2 is supplied with DC current. It may consist, for instance, of a coil winding which is kept in a superconducting state by a suitable coolant.

The entire travel distance is subdivided into line sections such as sections A, B, and C, shown in FIG. 1. In practical realization, each line section is several kilometers long. Each line section has a three-phase, traveling-field winding which can be viewed as the stator of a motor. The traveling-field winding, for instance, of the line section B acts, together with exciter 2 of the propulsion vehicle moving over it, as a synchronous linear motor.

The traveling-field windings in the individual line sections are supplied from stationary, controlled static converters (frequency changers). Line section B, for instance, is connected to a converter 3 which is supplied from three phase network 4. The converters each preferably consist of a controlled rectifier, an intermediate DC link, an inverter, and associated control devices, which are not specifically shown and are of a conventional nature. It is possible, by means of control voltages applied to terminals 15, 16 and 17, to feed electric power from supply network 4 into the traveling-field winding at the desired voltage, frequency and phase. The control voltages for converter 3 of line section B originate at a control unit 5, one of which is provided for each line section in response to signals from a vehicle controller 6. The design of these control units will be explained in detail below with the aid of FIGS. 3 to 5. The control units for the individual line sections are synchronized with each other in a manner not shown in detail, so that the transition of vehicle 1 from one line section to the next takes place without discontinuity. There is an information link between vehicle 1 and the control units of the individual line sections, as indicated in the FIG. 1 by transmitting antenna 7 on propulsion vehicle 1 and receiving antenna 8 on vehicle control unit 6 of the line section B.

Figure 2:
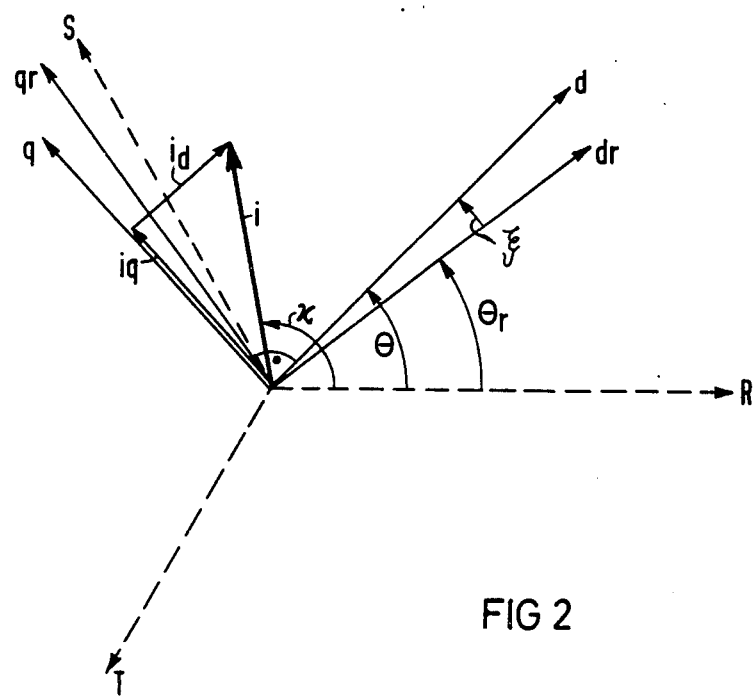
FIG. 2 is a three-dimensional vector diagram useful in understanding the control method.

FIG. 2 is a three-dimensional vector diagram of the current in the traveling-field winding to help explain the control principle. The vector representation is based on a point of view in which the movement of the exciter in translation over the traveling-field winding is expressed, by analogy to a rotating synchronous machine, as the angle of rotation $\chi$ of the current vector i relative to the R-axis, where a period of the traveling-field winding corresponds to an angle of rotation $2\pi$. As the d-q coordinate system, the Park axes known from the theory of synchronous machines are used. The d-axis and the phase R enclose vehicle position angle $\theta$.

For a two-component current control system, a system functioning in terms of polar coordinates or of Cartesian coordinates can be chosen. A control using polar coordinates in which the magnitude and the phase of the current can be independently controlled is described in German Pat. No. 23 41 761.

Control in Cartesian coordinates is provided in the illustrative embodiment, with current components $i_d$, $i_q$ moving in relation to the d, q axes. The current component $i_d$ in the direction of the d-axis determines the lift. The current component $i_q$ in the direction of the q-axis determines the thrust F of the synchronous linear motor.

A prerequisite for independent control of current components $i_d$ and $i_q$ in the direction of the d-axis and the q-axis is knowledge of the vehicle position angle $\theta$ between the d-axis of the translator-oriented d,q-coordinate system and the R-axis of the three-phase traveling-field-oriented coordinate system. In a linear motor, the vehicle position angle $\theta$ characterizes the relative position of the exciter mounted on the vehicle with respect to the traveling-field winding. The vehicle position angle $\theta$ can be measured directly by a suitable vehicle position measuring device. However, it is also possible to determine the vehicle position angle from the measured phase currents and phase voltages at the feed point into the traveling-field winding. This principle, known from German Pat. No. 23 41 761, is used also in the control system described below.

A vehicle position angle which is measured directly or is calculated from other measurement data will generally have inherent measurement errors. In the illustrative circuit described below, a similar computing circuit furnishes a calculated vehicle position angle $\theta_r$ which may deviate from the actual position angle $\theta$ by an error angle $\xi$.

The previously described control concept provides that, in the normal operating condition, i.e., with the vehicle in motion, the error angle $\xi$ is determined by a computing circuit and is fed to a position angle control as the control deviation. The position angle control determines the current components in such a way that the calculated vehicle position angle $\theta_r$ is set to the actual vehicle position angle $\theta$.

According to the present invention, a calculated vehicle position angle $\theta_r$ is preset during start-up from a velocity reference value, and is sequentially started. Furthermore, the thrust determined is that required so that the vehicle can follow the preset vehicle position angle $\theta_r$. Hunting is damped.

Figure 3:
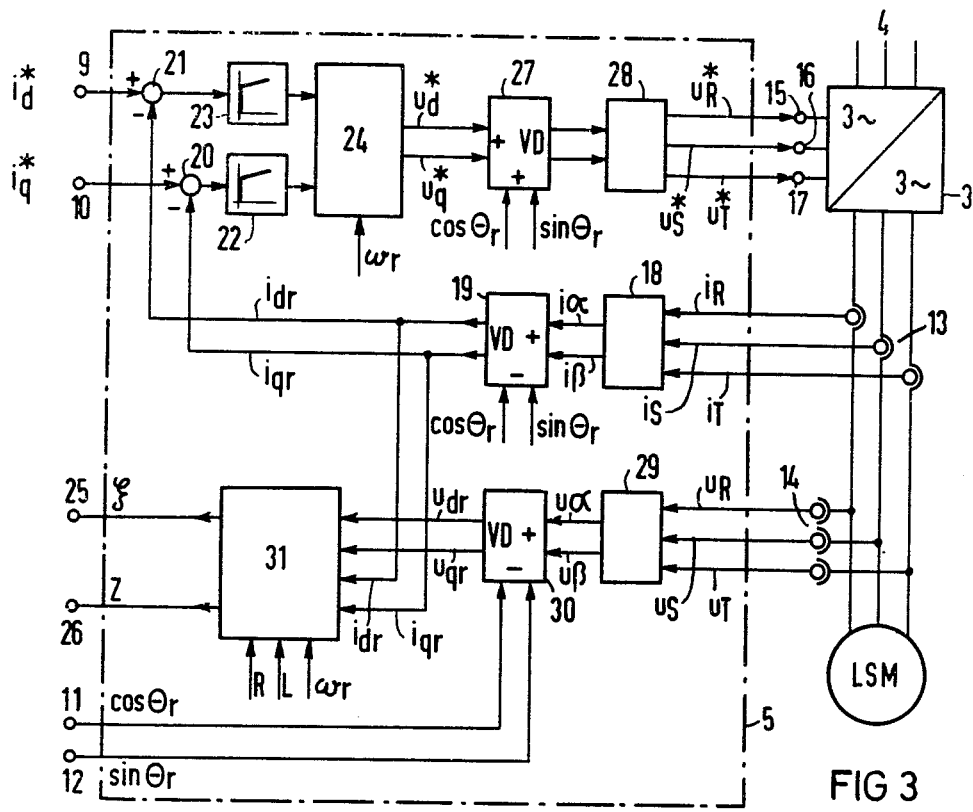
FIG. 3 is a schematic diagram of one embodiment of a control unit for one track section length.

FIG. 3 is a block diagram of a control unit 5 for one track section. Vehicle controller 6 presets the control inputs $i_d^*$ and $i_q^*$ for the current components in the d, q-axes at terminals 9 and 10 and the angle components $\cos \theta_r$ and $\sin \theta_r$ of the calculated vehicle position $\theta_r$. Measured values are also fed to control unit 5 at the terminals 11 and 12, from current measuring transformers 13 for the phase currents $i_R$, $i_S$, $i_T$ at the feed point of the traveling-field winding, and measured values of the phase voltages $u_R$, $u_S$, $u_T$ from the feed point of voltage transformers 14. Control unit 5 generates control voltages $u_R^*$, $u_S^*$, and $u_T^*$ at the terminals 15, 16 and 17 for the control unit of converter 3, and signals for error angle $\xi$ and suspension height z at terminals 25 and 26.

Figures 6, 7:
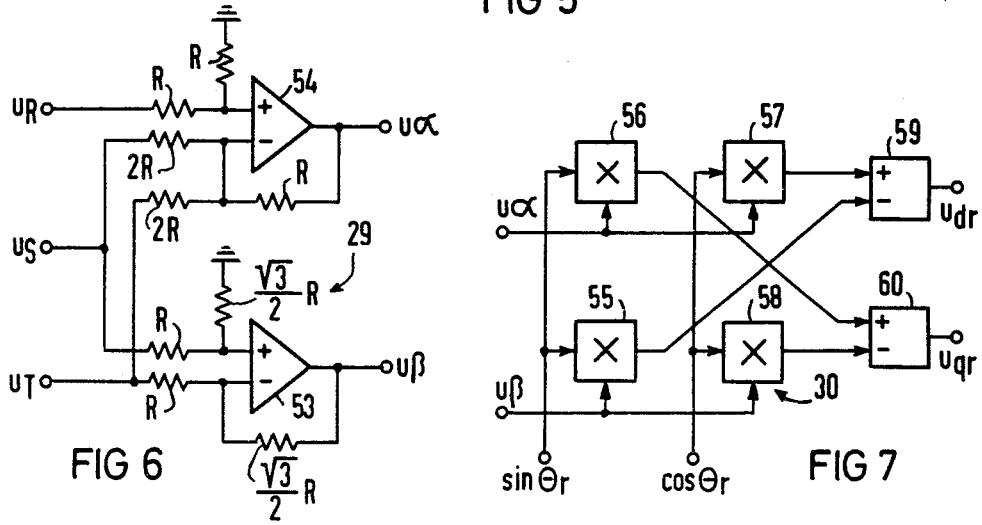
FIG. 6 is a block diagram of a 3/2-coordinate converter useful in the control unit of FIG. 3.
FIG. 7 is a block diagram of a vector rotator which is useful in the control unit.

The measured values of three-phase currents $i_R$, $i_S$ and $i_T$ at the feed point are transformed by 3/2-coordinate converter 18 (FIG. 6) into current components $i\alpha$ and $i\beta$ of a rectilinear $\alpha$-, $\beta$-coordinate system. The current components $i\alpha$ and $i\beta$ and the angle components $\cos \theta_r$ and $\sin \theta_r$ of the calculated vehicle position angle $\theta_r$ are fed into vector rotator 19 (FIG. 7). The output signals of vector rotator 19 represent the control inputs for the current components $i_{dr}$ and $i_{qr}$. The control inputs of the current components $i_{dr}$ and $i_{qr}$ are compared with the preset reference inputs $i_d^*$ and $i_q^*$ in difference elements 21 and 20 and the resulting control deviations are processed in current component controllers 23 and 22. Decoupling circuit 24 (FIG. 12) provides for static and dynamic decoupling, dependent on the operating point, of the two current control circuits. The control inputs $u_{dr}*$ and $u_{qr}*$ for the voltage components in the $d_r$, $q_r$-coordinate system appear at the outputs of decoupling circuit 24 and then are fed to a second vector rotator 27, together with the angle components cos $\theta_r$ and sin $\theta_r$ of the calculated vehicle position angle $\theta_r$. The output signals of second vector rotator 27 are converted in ⅔-coordinate converter 28 (FIG. 13) into a three-phase system of control voltages $u_R*$, $u_S*$, and $u_T*$ for the control set of converter 3.

Control unit 5, as shown in FIG. 3, also contains a circuit for determining vehicle position as expressed in terms of the error angle and the suspension height z. The circuit shown is based on the fact that the main field voltage induced in the traveling-field winding by the exciter moving in translation contains all the information required for control. In particular, the travel speed can be determined from the frequency of the main field voltage, the relative vehicle position from its phase angle, and, in a synchronous linear motor without iron, the suspension height from the magnitude and frequency of the main field voltage. By accurately synchronizing an oscillator, as to phase, with the main field voltage induced in the traveling-field winding by the exciter as it moves in translation, the reference signals for the control apparatus can be derived from the oscillator. Although the magnitude and the phase angle of the main field voltage are not accessible for direct measurement, they can be determined in a model circuit from the reactions of the synchronous linear motor appearing as measurable quantities at the point where the converter feeds into the traveling-field winding.

To this end, the three-phase voltages $u_R$, $u_S$ and $u_T$ determined at the feed point by measuring transformers 14 are converted in 3/2-coordinate converter 29 into voltage components $u\alpha$ and $u\alpha$ of the rectilinear $\alpha,\beta$-coordinate system. These orthogonal voltage components $u\alpha$ and $u\beta$ and the angle components cos $\theta_r$ and sin $\theta_r$ are fed to a third vector rotator 30. The output signals of thrid vector rotator 30 represent the actual values of voltage components $u_{dr}$ and $u_{qr}$ in the d,q-coordinate system and are fed, together with the actual values of the corresponding current comonents $i_{dr}$ and $i_{qr}$ from vector rotator 19, to a model motor 31. Model motor 31 determines, from these input data as well as from the calculated angular frequency $\omega_r$ and the values of ohmic resistance R and inductance L of the motor, a signal for the error angle $\xi$ and a signal for the suspension height z.

Figure 4:
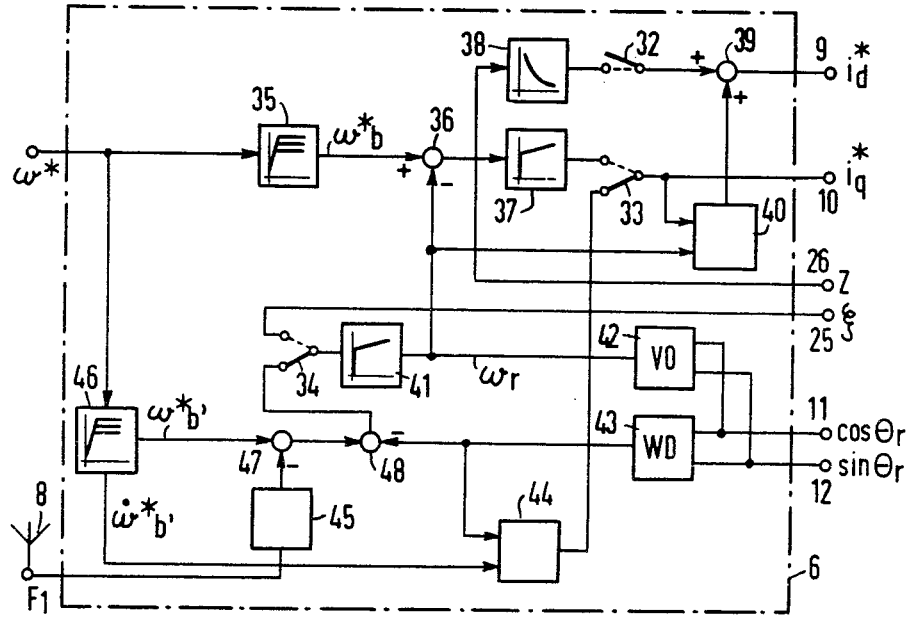
FIG. 4 is a schematic diagram of one embodiment of a vehicle control system in accordance with the teachings of the invention.

FIG. 4 shows a block diagram of one embodiment of vehicle control 6 according to the teachings of the invention. The switch arms of double-throw switching devices 32, 33 and 34 are shown in the position which they occupy during the starting-up process. However, to facilitate understanding the invention, the travel condition will be described first instead of the starting process. In the travel condition, the switch contacts of double-throw switching devices 32, 33 and 34 occupy the positions shown by the dashes.

Figure 14:
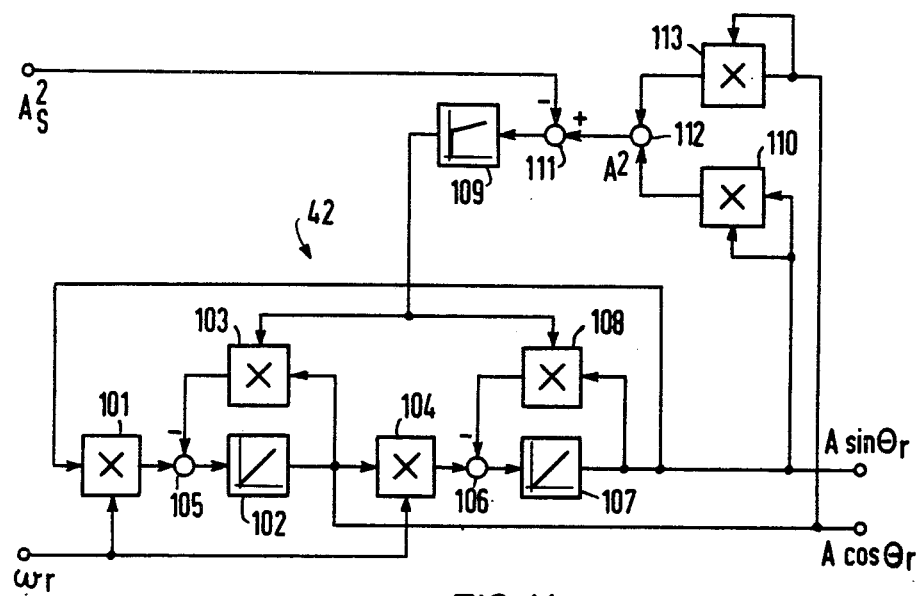
FIG. 14 is a block diagram of a vector oscillator useful in the control system of FIG. 4 or 5.

By means of an input device not specifically shown, the control input for travel speed is preset at the desired value $\omega*$ for the angular frequency. This reference value $\omega*$ is fed to start-up generator 35 which forms a limited reference value $\omega_b*$ for the angular frequency. The limited reference value $\omega_b*$ is compared with the actual value $\omega_r$ of the angular frequency in difference element 36. The resulting control deviation is fed to frequency control 37 which has a PI (Proportional integral) characteristic. The output signal of frequency controller 37 is the control input for the required thrust and is delivered at terminal 10 as the reference value $i_q*$ for the current component in the q-direction. The actual value of angular frequency $\omega_r$ is formed by angle control 41 from the error angle supplied at terminal 25. The output signal of angle control 41 is fed to difference element 36 as well as to a vector oscillator 42 (FIG. 14). Vector oscillator 42 forms angle components cos $\theta_r$ and sin $\theta_r$ of the calculated vehicle position angle $\theta_r$, which are delivered at terminals 11 and 12. A lift controller 38, having a PD (proportional differential) characteristic, and which is driven by suspension height signal z from terminal 26, is provided for the suspension height. The output signal of lift controller 38 is delivered as the reference value for the current component $i_d*$ in the d-direction, via terminal q, to the control unit 5 of a given track section.

As can be seen, when a control unit 5 of a track section, according to FIG. 3, and a vehicle control 6, according to FIG. 4, are viewed together, the angle components cos $\theta_r$ and sin $\theta_r$ of the vehicle position angle $\theta_r$ are determined, in travel operation, from the measured three-phase current and voltage components at the feed point of the traveling-field winding via the error angle calculated by the motor model 31, the control angle 41, and the vector oscillator 42. For forming the reference values $i_d*$ and $i_q*$ for the current components in the d,q-direction, the suspension height z determined by the motor model 31 and the actual value $\omega_r$ of the angular frequency, which, in turn, is derived from the error angle $\xi$ by the motor model 31, are required. The entire control concept is thus designed so that the motor model 31 is fed with input signals which are derived from the measured phase currents and phase voltages at the feed point of the traveling-field winding, the changes of which, caused by motion of the exciter in translation, permit determination of the variables required for control. This method does not work if the exciter is standing still.

According to the present invention, the propulsion vehicle is started by putting double-throw switching devices 32, 33, 34 in the position shown, thus cutting off the outputs of frequency control 37 and lift control 38 and the error angle input to angle control 41. The preset reference value $\omega*$ for the angular frequency is fed to a second start-up generator 46, which forms a limited reference value $\omega_b*$ for the angular frequency as well as its derivative $\dot{\omega}_b^{*1}$ taken with respect to time. The derivative $\dot{\omega}_b^{*1}$, with respect to time, of the limited reference value for angular frequency is significant as a reference value for acceleration.

In difference element 47, a signal derived from a measured value $F_1$ of the thrust of the propulsion vehicle, is added to the limited reference value $\omega_b*$ of angular frequency. For this purpose, the thrust value $F_1$ has been measured at the vehicle and is transmitted, for instance, via the already described information link, to the vehicle control. There, the measured thrust value $F_1$ is weighted in a proportional element 45 to provide the desired degree of damping.

Figures 8, 9:
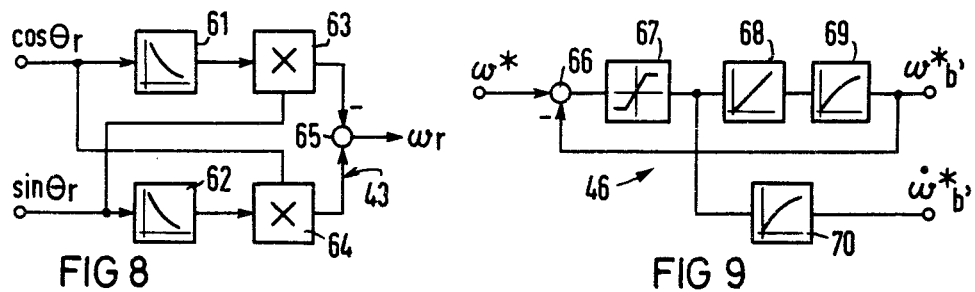
FIG. 8 is a block diagram of an angle differentiator useful in the control system of FIG. 4 or 5.
FIG. 9 is a block diagram of a starting up generator, useful in the control system of FIG. 4 or 5.

Vehicle control 6 also is provided with an electronic model 44 of the vehicle dynamics. Model 44 calculates the propulsion force required for acceleration from the acceleration reference value $\dot{\omega}_b^{*1}$ formed by start-up generator $y_6$, and from the actual value $\omega_r$ of the angular frequency formed by differentiator 43 (FIG. 8). The output signal of vehicle dynamics model 44 is fed, as the reference value $i_q^*$ for the current component in the direction of the q-axis, via switching device 33 and via terminal 10 to the control unit 5 of a given line section.

The reference value $i_d^*$ for the current component in the direction of the d-axis is formed by a characteristic-curve generator 40 (FIG. 15), to which the value $\omega_r$ for angular frequency and the reference value $i_q^*$, generated by model 44 for the current component in the direction of the q-axis, are fed.

The current components $i_d$ and $i_q$ in the direction of the d-axis and the q-axis are therefore determined during start-up, not as a function of the measured, or calculated, vehicle position angle $\theta_r$, but from the predetermined reference values for velocity and angular frequency, respectively. Start-up is accomplished by means of a controlled increase in angular frequency; a measured value is used for the thrust, in a compensatory sense, in order to damp out hunting.

The output signal of difference element 47 and the output signal of angle differentiator 43 are fed to another difference element 48. The angle differentiator 43 (FIG. 8) forms a signal for the angular frequency from the angle components $\cos\theta_r$ and $\sin\theta_r$ of the vehicle position angle $\theta_r$, which is very accurate at low vehicle velocities. The output signal of difference element 48, which represents the deviation of the angular frequency formed by angle differentiator 43 from its limited and damped reference value, is fed via switching device 34 to angle control 41, whose output signal represents the calculated angular frequency $\omega_r$. The output signal of the angle control 41 is fed to vector oscillator 42 (FIG. 14), which forms the angle components $\cos\theta_r$ and $\sin\theta_r$ of the determined vehicle position angle $\theta_r$. The angle components of the vehicle position angle $\theta_r$ are fed to the angle differentiator 43 and to terminals 11 and 12 of the control unit 5 for a given line section. In start-up operation, the angle components of the determined vehicle position angle $\theta_r$ are thus not derived from the measured phase currents and voltages at the feed point of the traveling-field winding; instead, they are derived from the predetermined reference values for velocity and angular frequency, respectively, taking into account the desired damping.

Figure 5:
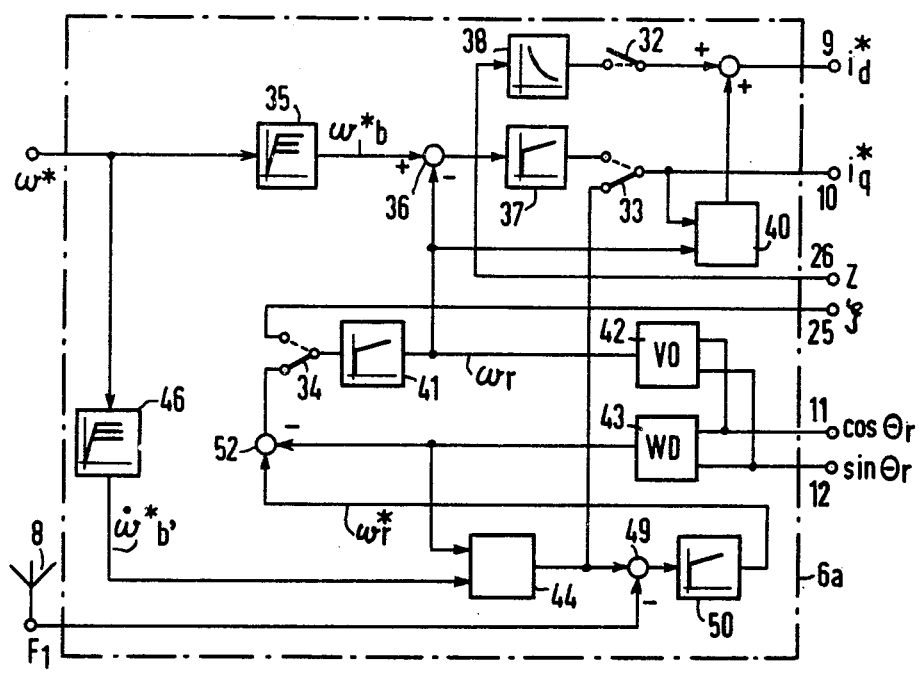
FIG. 5 is a schematic diagram of a second version of a vehicle control system according to the invention.

FIG. 5 shows the block diagram of an embodiment of a vehicle controller 6a designed in accordance with the teachings of invention. In travel operation, the circuit shown works in the same manner as the circuit according to FIG. 4. Therefore, only the operation of the circuit during starting will be described. In the start-up, the switch contacts of the double-throw switching devices 32, 33 and 34 are in the position shown.

The control input for the travel speed is preset as reference value $\omega^*$ for angular frequency and is fed to start-up generator 46 which forms a derivative $\dot{\omega}_b^{*1}$, with respect to time, of a limited reference value for the angular frequency which can again be considered as the reference value for the required acceleration and which is fed to electronic vehicle dynamics model 44. Model 44 is also fed the output signal of angle differentiator 43. Angle controller 41 is preceded on the input side by difference element 52, to which are fed the output signal of angle differentiator 43 and the output signal of thrust control 50 with PI characteristic. Thrust control 50 is preceded by difference element 49, to which are fed the output signal of electronic model 44, representing the reference value for the required thrust, as well as a measured value $F_1$ of the thrust occurring at the vehicle. The reference value $\omega_r^*$ for angular frequency is thus the output signal of thrust control 50, which is driven by the thrust reference value determined by electronic model 44. In this way, the angle components $\cos O_r$, $\sin O_r$ of the determined vehicle position angle $O_r$ are brought into dependence on the output signal of control 50. The value of angular frequency determined by angle differentiator 43 also affects electronic vehicle dynamics model 44, the output signal of which is delivered, via switch 33, directly to terminal 10 as reference value $i_q^*$ for the current component on the direction of the q-axis. The value $\omega_r$ of the angular frequency determined by angle control 41 further influences, via the characteristic-curve generator 40 (FIG. 15), the reference value $i_d^*$ for the current component in the d-direction, which is delivered at the terminal q.

FIG. 6 shows the circuit diagram of a 3/2-coordinate converter 29 for transforming the measured voltage components $u_S$, $u_T$, $u_T$ of the three-phase traveling-field winding into the two-phase voltage components $u\alpha$ and $u\beta$ of an orthogonal $\alpha,\beta$-coordinate system. The 3/2-coordinate converter 29 contains two operational amplifiers 53 and 54 which are equipped in the manner shown with input and feedback resistors having the resistance proportions indicated in the drawing.

The 3/2-coordinate converter 18 in which the measured values of the phase currents are converted into the orthogonal $\alpha,\beta$-coordinate system is designed analogously, as will be understood by those skilled in the art.

FIG. 7 is a block diagram of vector rotator 30. Vector rotator 30 contains four multipliers 55 to 58 as well as a subtractor 59 and an adder 60. The components mentioned, which are connected to each other in the manner shown, implement the addition theorem for sum angles. The components $u_{dr}$ and $u_{qr}$ are formed from the components $u\alpha$ and $u\beta$ and the angle components $\cos\theta_r$, $\sin\theta_r$.

Vector rotators 19 and 27 are built the same way.

FIG. 8 is a block diagram of angle differentiator 43, which determines the angular frequency $\omega_r$ from the angle components $\cos\theta_r$, $\sin\theta_r$ of the calculated vehicle position angle $\theta_r$. Angle differentiator 43 contains differentiating elements 61 and 62 as well as multiplers 63 and 64 connected as shown. The output signals of multipliers 63 and 64 are fed to difference element 65, the output signal of which represents the angular frequency $\omega_r$.

FIG. 9 is a block diagram of start-up generator 46 which determines a limited reference value $\omega_b$, and an acceleration reference value $\omega_b^*$ from the present reference value $\omega^*$ for the angular frequency. The angular frequency value $\omega^*$ is fed through difference element 66 to limiter stage 67 which is followed by integrator 68 and a first time delay element 69. The output signal of time delay element 69, limited reference value $\omega_b^*$, is fed back to difference element 66. The output of limiter element 67 is also fed to a second time delay element 70, whose output signal $\dot{\omega}_b^{*1}$, is the acceleration reference value, determined by the derivative with respect to time of the limited reference value for the angular frequency.

Figure 10:
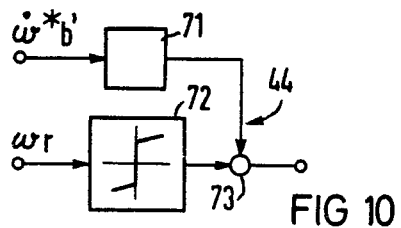
FIG. 10 is a block diagram of an electronic model for simulating the vehicle dynamics in the control system of FIG. 4 or 5.

FIG. 10 is a block diagram of electronic vehicle dynamics simulator 44 which determines the required thrust from the derivative, with respect to time, of the limited reference value $\dot{\omega}_b^{*1}$ for the angular frequency, and from the value $\omega_r$ for the angular frequency. In it, the value $\omega_r$ for angular frequency is fed to function generator 72, the function of which is chosen in such a way that its output signal represents an image of the friction force. The acceleration reference value $\ddot{w}_b^{*1}$ is weighted in proportioning element 71 with the mass of the vehicle. The output signal of proportional element 71 gives the force required for the desired acceleration. The output signals of proportional element 71 and characteristic-curve generator 72 are added in summing element 73, the output signal of which represents a measure of the required thrust.

Figure 11:
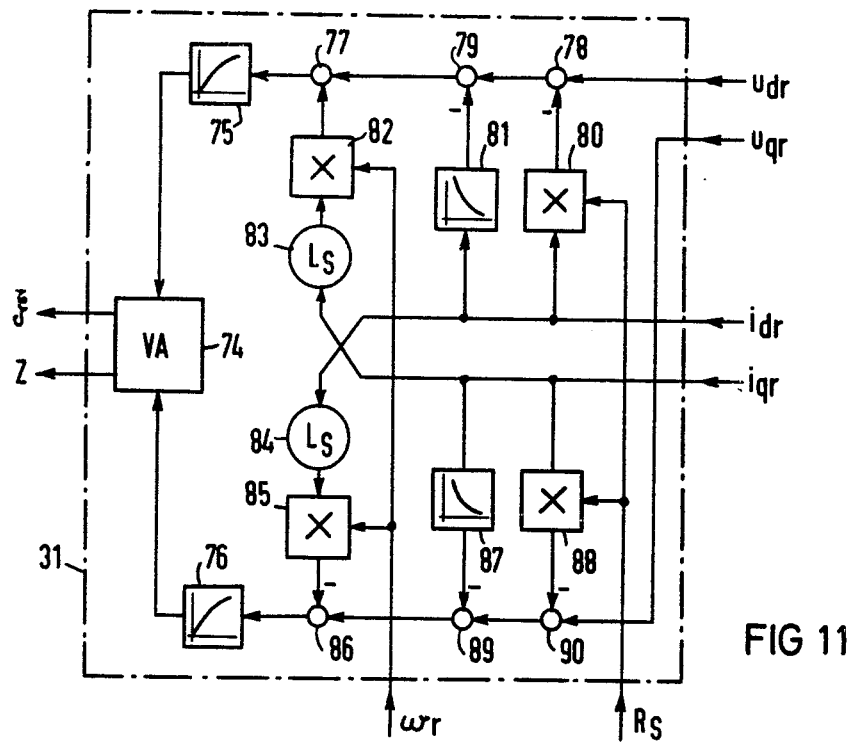
FIG. 11 is a block diagram of a motor model useful in the control unit of FIG. 3.

FIG. 11 is a block diagram of an implementation of motor model 31 for determining the error angle $\xi$ and the suspension height z from voltage components $u_{dr}$, $u_{qr}$ and current components $i_{dr}$, $i_{qr}$, taking into consideration the angular frequency $\omega_r$, the ohmic resistance $R_S$ and the inductance $L_S$ of the stator winding. In it, the current component $i_{dr}$ is multiplied in multiplier 80 by the ohmic resistance $R_S$ of the stator winding. The output signal of multiplier 80, which gives the corresponding component of the voltage drop in the stator winding, is subtracted in difference element 78 from voltage component $u_{dr}$ and the result is fed to a second difference element 79. The current component $i_{dr}$ is further fed through differential element 81 to the substracting input of second difference element 79. The output signal of second difference element 79 is fed to a summing element 77. The current component $i_{qr}$ is weighted in proportional element 83 with the inductance $L_S$ and fed to multiplier 82, the second input of which is supplied with the angular frequency $\omega_r$. The output signal of multiplier 82 is fed to summing element 77, the output signal of which is fed, via time delay element 75, to one input of vector analyzer 74. A suitable vector analyzer is described in German Pat. No. 23 53 594, FIG. 8.

Similarly, the current component $i_{qr}$ is multiplied in multiplier 88 by the ohmic resistance $R_S$ of the stator winding and subtracted in difference element 90 from the voltage component $u_{qr}$. The current component $i_{qr}$ is also conducted, via differential element 87, to a further difference element 89, the output signal of which is subtracted from the output signal of difference element 90. The current component $i_{dr}$ is weighted in proportional element 84 with the inductance $L_S$ of the stator winding and multiplied by the angular frequency $\omega_r$ in multiplier 85. The output signal of multiplier 85 is subtracted in difference element 86 from the output signal of difference element 89 and the output voltage of the latter is fed, via a time delay element 76, to a second input of vector analyzer 74. The vector analyzer determines the error angle and the main field voltage which can be set equal, in good approximation, to the suspension height z.

The circuit between the inputs and outputs of summing element 77 and difference element 86 and fed by voltage components $u_{dr}$, $i_{qr}$ and current components $i_{dr}$, $i_{qr}$ implements Park's equations as applied to a synchronous linear motor.

Figure 12:
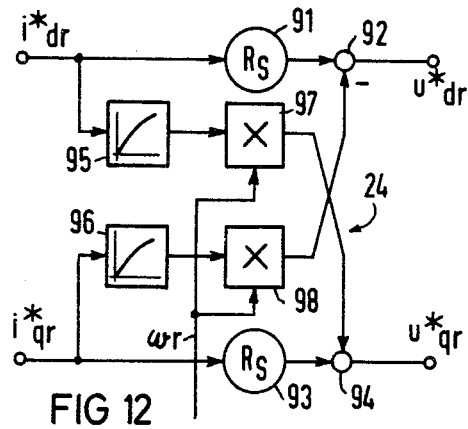
FIG. 12 is a block diagram of a motor decoupling unit useful in the control unit of FIG. 3.

FIG. 12 is a block diagram of an implementation of decoupling circuit 24. The input signals are the reference values $i_{dr}^*$, $i_{qr}^*$ for the current components in the $d_r$, $q_r$ axes, which are formed by the current component controls 22 and 23. The input signal $i_{dr}$ is weighted in proportional element 91 with the resistance $R_S$ of the stator winding and fed to difference element 92. The subtraction input of difference element 92 is connected to the output of multiplier 98, the inputs of which are connected to the angular frequency $\omega_r$ and the output of time delay member 96. Time delay member 96 is acted upon by the other input signal $i_{qr}^*$. The output signal of difference member 92 is the reference value $u_{dr}^*$ for the control voltage component in the direction of the d-axis.

Similarly, the input signal $i_{qr}^*$ is weighted in proportional element 93 with $R_S$ and fed to summing element 94. The other input of adder 94 is connected to the output of another multiplier 97, the inputs of which are connected to the angular frequency $\omega_r$ and to time delay member 95 which is addressed by the input signal $i_{dr}$. The output signal of adder 94 is the reference value $u_{qr}^*$ for the control voltage component in the q-direction.

Figure 13:
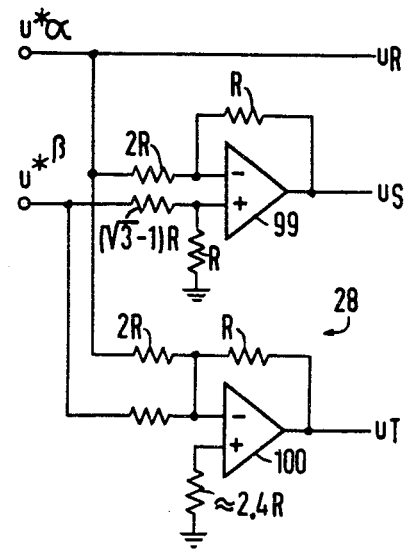
FIG. 13 is a block diagram of a ⅔-coordinate converter useful in the control unit of FIG. 3.

FIG. 13 is a schematic diagram of $\frac{2}{3}$-coordinate converter 28. The converter comprises two operational amplifiers 99 and 100, which are equipped with resistors whose resistances are proportioned as shown. The $\frac{2}{3}$-coordinate converter realizes the following equations:

$$U_R^* = U_\alpha; \quad U_S^* = -\frac{U_\alpha}{2} + \frac{\sqrt{3}}{2} \cdot U_\beta;$$

$$U_T^* = -\frac{U_\alpha}{2} - \frac{\sqrt{3}}{2} \cdot U_\beta$$

The output signals of the $\frac{2}{3}$-coordinate converter are the three-phase control voltages for the converter 3.

FIG. 14 is a block diagram of the structure of vector oscillator 42. Vector oscillator 42 contains two series-connected integrators 102 and 107 having feedback paths containing multipliers 103 and 108, respectively. The output signal of multiplier 103 in the feedback path of integrator 102 and the output signal of a multiplier 101 are fed to difference element 105 in the input of first integrator 102. The inputs of multiplier 103 are connected to the output of integrator 102 and to the output of control 109, which has a PI characteristic. The inputs of multiplier 101 are connected to the angular frequency $\omega_r$ and to the output of second integrator 107. The output signal of another multiplier 104 and the multiplier 108 in the feedback path of the second integrator 107 are fed to difference member 106 in the input of second integrator 107. The inputs of multiplier 108 are connected to the output of integrator 107 and to the output of control 109.

The output of integrator 107 represents the sine component $A \sin \theta_r$ and the output signal of integrator 102, the cosine component $A \cos \theta_r$ of an oscillation having the amplitude A. The two angle components are squared in squarers 110 and 113 and the products added in a summing element 112. The result $A^2$ is compared in difference member 111 with a preset amplitude control voltage $A_S^2$. The difference drives the control 109, the output signal of which is fed to multipliers 103 and 108 in the feedback paths of integrators 102 and 107.

The circuit of FIG. 14 generates a steady-state oscillation, the frequency as well as the amplitude of which is controllable. The two multipliers 101 and 104 in series with integrators 102 and 107 provide a controllable integration time and thus determine, via the angular frequency $\omega_r$, the frequency of the oscillation and thereby, the vehicle position angle. The amplitude is controlled via amplitude control voltage $A_S^2$. In this illustrative embodiment, it serves for normalizing the level of signal processing.

Figure 15:
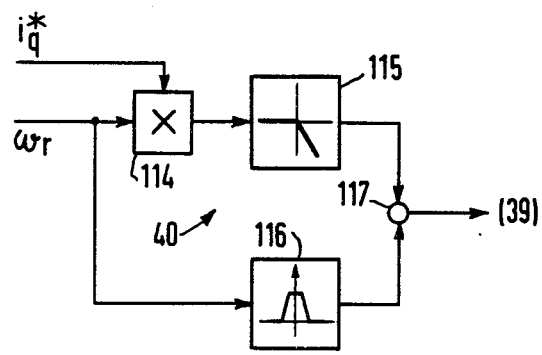
FIG. 15 is a block diagram of a characteristic curve generator useful in the control systems of FIG. 4 or 5.

FIG. 15 shows the structure of characteristic-curve generator 40. The angular frequency $\omega_r$ and the reference value $i_q^*$ for the current component in the direction of the q-axis are fed as input signals to multiplier 114. The output signal of multiplier 114 is conducted to a first characteristic-curve generator 115 which has the characteristic shown graphically in the block diagram. The angular frequency $\omega_r$ is also conducted to a second characteristic-curve generator 116, having the characteristic shown in the block diagram. The output signals of the two characteristic-curve generators 115 and 116 are added in summing element 117. The output signal of the summing element represents the steady-state component of current in the direction of the d-axis, determining the lift. This steady state component is essentially governed during stating by characteristic-curve generator 116 and, during travel at high speed, by characteristic-curve generator 115.

What is claimed is:

1. A circuit arrangement for starting a trackbound electric propulsion vehicle driven by a synchronous linear motor without iron having a stator which is a traveling-field winding installed along the track and an exciter which is a translator carried on the vehicle, the traveling-field winding being supplied from a stationary, controlled static frequency converter whose output frequency and voltage may be varied by a control device having a computing circuit for determining the travel velocity and the relative position of the exciter with respect to the traveling-field winding from the phase currents and voltages at the feed point, comprising means for opening the control circuit of the control device during start-up and substituting a starting circuit for generating the required thrust, the travel velocity, and the position of the exciter relative to the traveling-field winding from a velocity reference value controlled by a start-up generator, and means for deriving a signal for damping the control current component regulating the thrust from a measured value of the thrust connected into the associated starting control circuit.

2. A circuit arrangement according to claim 1 further comprising means for adding the measured value for the thrust, weighted by a reduction factor, to the control component determining the thrust, in a compensating sense.

3. A circuit arrangement according to claim 1 further comprising a thrust controller, driven by the difference between the measured value of the thrust and the generated control component determining the thrust and having an output signal for determining the exciter position relative to the traveling-field winding and for determining the travel velocity.

* * * * *